Patented Apr. 28, 1925.

1,535,952

UNITED STATES PATENT OFFICE.

JAKOB SCHWARZKOPF, OF ELMSHORN, GERMANY.

POLISHING COMPOSITION.

No Drawing. Application filed October 28, 1924. Serial No. 746,400.

*To all whom it may concern:*

Be it known that I, JAKOB SCHWARZ-KOPF, a citizen of the German State, residing at 9, Muhlenstrasse, Elmshorn, in Holstein, Germany, have invented a certain new and useful Polishing Composition, of which the following is a specification.

Polishes made of wax and wax-like substances for leather, linoleum, wood and the like are known in various forms of preparation and in various compositions. The suitability of these preparations for the purposes, for which they are intended, depends partly on the kinds of wax and wax substitutes used, partly on the softening solvent liquids and distributing emulsifying liquids and partly on the suitability of the method of preparation as regards the conversion of the wax and wax-like substances into covering and coating materials that spread easily and have the consistency of salves or viscous emulsions. The new polishes of this kind differ from the known kinds in containing a wax-like substance for enhancing the polishing action of the waxes and wax substitutes, which can be produced from coffee, coffee waste or from other parts of the coffee fruit and the coffee tree, such as coffee shells and the leaves of the coffee tree, by treating these substances with wax solvents or by melting them out in any way, for instance by boiling them with water or steam or in any other manner. Such a wax-like substance is obtained as a by-product in the manufacture of caffeine-free coffee and is commonly sold under the name of " coffee wax." The increase in brilliance due to the presence of coffee wax becomes apparent even with an addition of only $\frac{1}{10}\%$. For obtaining a great increase in the brightness of the polish about $\frac{1}{2}$ to $3\%$ according to circumstances of the coffee wax is added to the usual combination of polishing agents. The best proportions between the coffee wax and the other ingredients of the polish may be ascertained by experiment.

As an example the composition of a shoe polish may be given: 3 parts Montan wax, 8 parts carnauba wax, 16 parts ceresine, $\frac{1}{2}$ to 3 parts coffee wax, 4 parts aniline dyes, and 68 parts oil of turpentine.

These ingredients are carefully heated and caused to unite by melting and dissolving as is the usual practice when making polishes without an addition of coffee wax. The oil of turpentine may be replaced by the cheaper benzine or some other solvent or mixture of solvents without the brilliance of the polish being adversely affected. In place of such solvents water may be used in the manufacture of the polish with or without means for emulsification or colloidal distribution. In such emulsion-like polishes as well the coffee wax content has the same effect of enhancing the brilliance.

What I claim is:—

1. A polish made of wax and wax-like substances, for polishing leather, linoleum, wood and the like, including a solvent and the ingredient " coffee wax," as set forth.

2. A polish for polishing leather, linoleum, wood and the like, comprising as ingredients approximately 3 parts Montan wax, 8 parts carnauba wax, 16 parts ceresine, $\frac{1}{2}$ to 3 parts coffee wax, 4 parts aniline dyes, and 68 parts oil of turpentine.

In testimony whereof I affix my signature in presence of two witnesses.

JAKOB SCHWARZKOPF.

Witnesses:
PAUL DEIBERT,
C. RAYAUK.